(12) United States Patent
Tsau

(10) Patent No.: US 7,025,584 B2
(45) Date of Patent: Apr. 11, 2006

(54) MOLD BASE ASSEMBLY

(75) Inventor: Tar Tsau, Burlington (CA)

(73) Assignee: Wentworth Mold Inc., Hamilton (CA)

( * ) Notice: Subject to any disclaimer, the term of this patent is extended or adjusted under 35 U.S.C. 154(b) by 329 days.

(21) Appl. No.: 10/650,682

(22) Filed: Aug. 29, 2003

(65) Prior Publication Data

US 2005/0048155 A1    Mar. 3, 2005

(51) Int. Cl.
    *B29C 49/64*  (2006.01)
(52) U.S. Cl. .......................... 425/526; 249/79
(58) Field of Classification Search .......... 425/526; 249/79
    See application file for complete search history.

(56) References Cited

U.S. PATENT DOCUMENTS

| | | | |
|---|---|---|---|
| 3,354,509 A | 11/1967 | Ammondson | |
| 3,843,286 A * | 10/1974 | Horberg et al. | 425/526 |
| 4,200,149 A | 4/1980 | Pechner | |
| 4,655,280 A | 4/1987 | Takahashi | |
| 4,966,544 A | 10/1990 | Mitake | |
| 5,255,889 A * | 10/1993 | Collette et al. | 249/102 |
| 5,647,114 A | 7/1997 | Pleasant | |
| 5,762,981 A | 6/1998 | Nitsche | |
| 5,830,515 A | 11/1998 | Pleasant et al. | |
| 5,971,740 A * | 10/1999 | Rees | 425/526 |
| 6,168,415 B1 | 1/2001 | Pleasant et al. | |
| 6,338,380 B1 | 1/2002 | O'Dwyer | |
| 6,358,031 B1 | 3/2002 | Kikuchi et al. | |
| 6,358,033 B1 | 3/2002 | Pleasant | |
| 6,444,159 B1 | 9/2002 | Petre | |
| 6,447,281 B1 | 9/2002 | Petre | |
| 6,843,646 B1 * | 1/2005 | Ryan et al. | 249/79 |

FOREIGN PATENT DOCUMENTS

| | | |
|---|---|---|
| DE | 19925756 A1 * | 12/2000 |
| GB | 2240300 A | 7/1991 |

* cited by examiner

*Primary Examiner*—Robert B. Davis

(57) ABSTRACT

A base assembly used as a part of a mold assembly for forming a container has a base insert and a flow divider plate that co-operate to define a continuous fluid passageway for cooling or heating the base insert. The flow divider plate has an upper surface portion having at least one raised runway extending in a first pattern covering a substantial area of the upper surface portion. The base insert has a lower surface portion with a continuous channel extending in a second pattern. The channel is positioned adjacent the at least one raised runway in sealing relation therewith to define a continuous fluid passageway.

28 Claims, 4 Drawing Sheets

MOLD BASE ASSEMBLY

FIELD OF THE INVENTION

The present invention relates to a base assembly for use as part of a modular mold for making containers, and more particularly to the cooling/heating passageways utilized in such a base assembly.

BACKGROUND OF THE INVENTION

Mold assemblies comprising two side mold parts and a base mold part are commonly used in the formation of plastic containers such as, for example, biaxially-oriented PET (polyethylene terephthalate) beverage bottles. The side mold parts may comprise a unitary half-part, multiple half-parts or a shell half insert. The base part of the mold assembly is typically manufactured from a steel adaptor plate and a cast steel or cut steel base insert that is inserted into the mold assembly.

The base insert is formed with a base mold face having a pattern or impression corresponding to the bottle to be formed. The adaptor plate is typically a cylindrical shaped plate to which the base insert is secured by threaded screws or bolts. The bolts pass through threaded apertures in the adaptor plate and into threaded apertures in the base insert. The adaptor plate acts to mount the base insert relative to a supporting pedestal assembly comprises a light weight base insert, preferably made from aluminum, having an upper surface containing the pattern of the base of the container to be formed. The light weight base insert is mounted to the adapator plate by the use of screws. A wear ring made from a hardened steel surrounds the base insert to protect and add strength to the light weight base insert.

Fluid circulating passages are machined into the adaptor plate and the base insert to assist in the cooling of the base mold part during the formation of the bottle. These passageways, as shown in the aforementioned U.S. Pat. No. 5,762,981, extend into the center of the adaptor plate, up into the base insert and then into a plurality of axially spaced apart radially extending outward passageways that pass back out through the adapter plate. These parallel radial flow passageways may not have equal flow of coolant there through, in practice, possibly resulting in non-uniform cooling of the mold base. Further, any blockage in one of the radial passageways may go undetected because the other passageways continue to function.

SUMMARY OF THE INVENTION

The present invention relates to a base assembly used as a part of mold assembly for forming a container. The base assembly includes a base insert and a flow divider plate that co-operate with each other to define a continuous fluid passageway for cooling or heating the base insert. The flow divider plate has an upper surface portion having a first flow pattern machined thereon. The base insert has a lower surface portion with a second pattern machined thereon. The second flow pattern is positioned adjacent the first flow pattern in sealing relation therewith to define the continuous fluid passageway.

The continuous or serial fluid passageway of the present invention has advantage over the parallel radical passageways of the prior art because by utilizing a continuous fluid passageway in the base insert and co-operating flow divider plate any blockage in the passageway may be detected The continuous or serial fluid passageway of the present invention has advantage over the parallel radical passageways of the prior art because by utilizing a continuous fluid passageway in the base insert and co-operating flow divider plate any blockage in the passageway may be detected by the pumping system for the cooling fluid. Further, advantage is found in the base assembly because the passageways are not drilled through the base insert but instead are machined from one face of the insert and one face of the flow divider plate thereby providing a fluid cooling passageway pattern that is able to cover more surface area of the mold face of the base insert. This feature consequently enhances heat transfer between the mold face and fluid passing along the continuous fluid passageway to better cool or heat the base insert over its mold face.

It should be understood that the use of the term base insert (base plug) as used throughout the specification and claims refers to the function of the base insert as a die part in the mold to shape the base of the container during the formation of the container. An upper surface is defined for the base insert that is contoured to have the shape of the container being formed. It should be understood that the upper surface or mold face of the base insert may have a recessed generally concave shape forming a cavity insert, or the upper surface of the base insert may have a projecting generally convex shape forming a push up insert.

The first flow pattern may comprise at least one raised runway and the second flow pattern may comprise a channel whereby at least a portion of the channel overlays the at least one raised runway to define at least a portion of the continuous passageway.

In one embodiment the channel in the base insert comprises a recessed groove and a plurality of cavities that extend from the lower surface portion of the base insert deeper into the base insert than the recessed groove.

The at least one raised runway may have a plurality of baffles extending outwardly therefrom and into a corresponding one of the cavities to redirect flow of fluid through the cavities. Each of the cavities may have a dome end portion and each of the corresponding baffles may have a rounded tip portion that extends into the corresponding cavity. The raised runway of the flow divider plate may further include fillet surfaces adjacent each side of each of the baffles.

The base insert has a contoured shape on an upper surface portion that corresponds to the shape of the base of the container to be formed. This contoured upper surface portion may have a series of indentations representing container feet. It is envisaged that the cavities extend into the base insert between these indentations to enhance heat transfer around the surfaces of the feet to be formed in the base of the container.

To further enhance heat transfer, the continuous fluid passageway may have a cross-sectional area that varies along the passageway to increase turbulence of the fluid flowing along the passageway.

In accordance with the present invention there is provided a base assembly for use as a part of a mold assembly for forming containers. The base assembly comprises an adapter plate, a flow divider plate and a base insert. The adaptor plate has an upper supporting surface. The adapter plate has two fluid communication ports located in the upper supporting surface and at least one fluid inlet port and one fluid outlet port each of which communicate with a corresponding one of the two fluid communication ports. The flow divider plate is adapted to be supported on the upper supporting surface of the adapter plate in fluid sealing relation therewith. The flow divider plate has an upper surface portion having a first flow pattern machined thereon. The base insert has a lower surface portion mounted in sealing relation with the flow divider plate. The lower surface portion of the base insert has a second flow pattern machined thereon. The second flow pattern is positioned adjacent at least a portion of the first flow pattern in sealing relation therewith to define a continuous fluid passageway extending between the two fluid communication ports of the adapter plate. The base insert has an insert upper surface portion contoured to the shape of a base of the container to be formed.

BRIEF DESCRIPTION OF THE DRAWINGS

A more complete understanding of the apparatus of the present invention may be obtained by reference to the following detailed description when taken in conjunction with the accompanying diagrammatic drawings wherein.

DETAILED DESCRIPTION OF EMBODIMENTS

Figure 1:
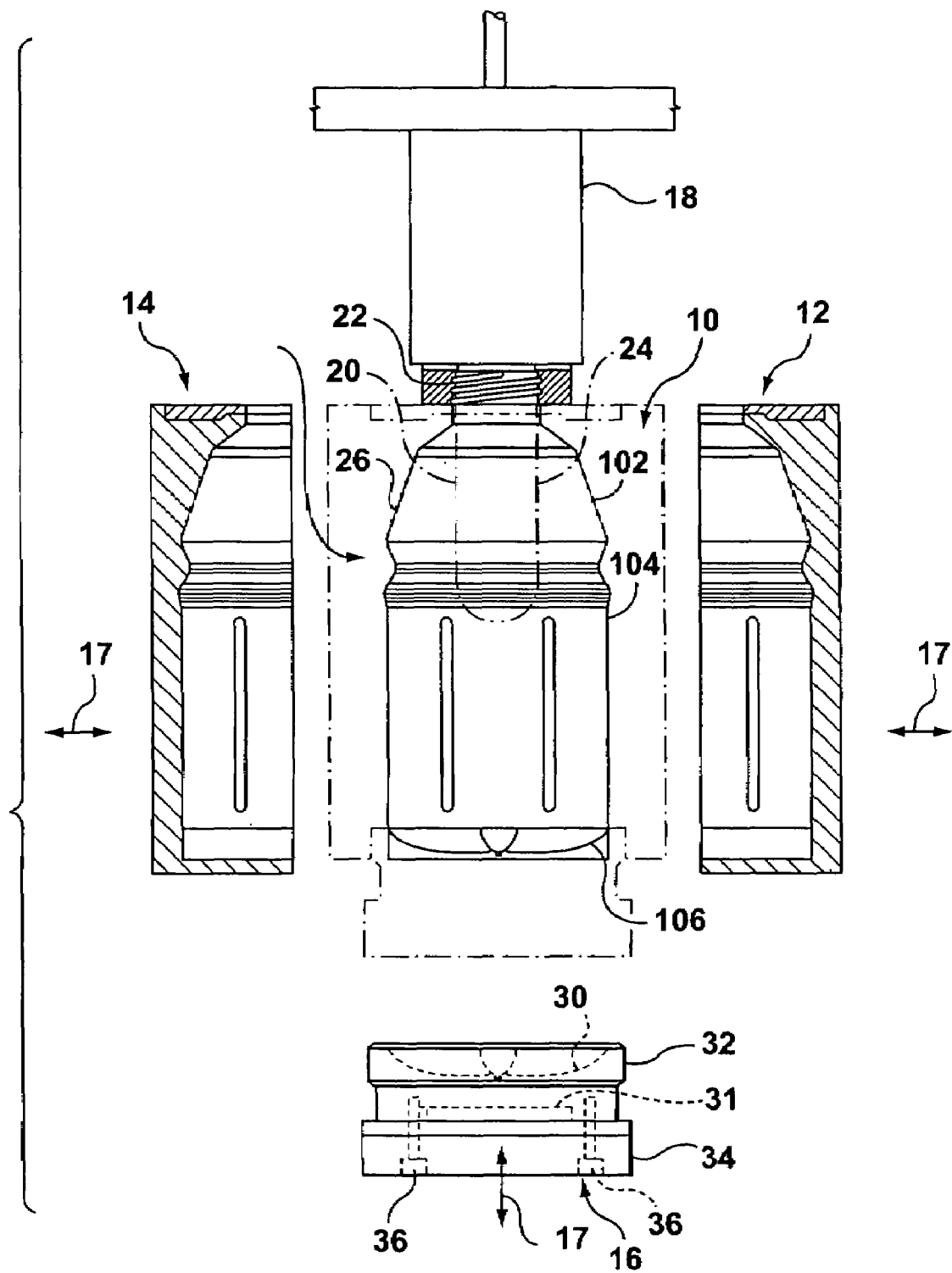
FIG. 1 is a schematic partially in section view of a formed bottle and three separated mold members where both the preform and closed mold members are shown in phantom.

Referring to the drawings the embodiments of the present invention are described. While the mold apparatus described herein is adapted for making a cold fill PET bottle, it should be understood that the mold apparatus shown can be used for other types of containers when the mold face is changed, such as for example, water, soft drinks, juices, cleansers, and detergent type containers to name a few.

In FIG. 1, the bottle 100 is made from a preform 20 having a thread finish 22 attached to carrier 18 and a lower tube portion 24 which is blown into a bottle shape in a mold 10. During blowing the preform assumes the shape of the interior molding surface 26 of the mold to form an upper shoulder portion 102, a middle label panel portion 104, and a base 106. The upper shoulder 102 flares radially outwardly from the relatively narrow tube portion 24 to the label panel 104.

The modular mold assembly shown in FIG. 1 includes three movable mold parts 12, 14, and 16 which come together as indicated by the arrows 17 to form the closed mold shown in phantom around preform 20. The upper right and left half mold parts 12 and 14 respectively are mirror images and move horizontally to close. The third mold part comprises the base assembly 16 of the present invention which moves vertically to fit within a base receiving portion of the parts 12 and 14.

The base assembly 16 comprises an aluminum base insert 30, an aluminum flow divider plate 31, a steel hardened wear ring 32, and an adaptor steel plate 34. The three component parts 30, 32, and 34 are secured together by threaded fasteners or bolts 36 which threadably engage threaded apertures in wear ring 32. It should be understood that if a wear ring 32 is not utilized in the base assembly 16 then the base insert 30 and flow divider plate 31 may comprise steel parts.

Referring to FIGS. 2 through 6 the base assembly 16 of the present invention is shown. In this embodiment, the base insert 30 rests directly on top of the adaptor plate 34. The base insert 30 has a lower surface 37 positioned on the upper supporting surface portion 28 of the adaptor plate 34. The base insert 30 includes an upper surface or mold face 38 contoured to the shape of a base of the container to be formed. In this embodiment, the base insert upper surface 38 is generally concave in shape and is commonly referred to as a "cavity insert". It should be understood that alternatively the insert upper surface 38 may have a generally convex shape which is referred to as a "push up insert".

The base insert 30 has upper and lower annular side wall portions 40 and 42, respectively. The lower annular side wall portion 42 is closer to the adaptor plate 34 than the upper annular side wall portion 40. The lower annular side wall portion 42 has a larger diameter than the upper annular side wall portion 40 such that the lower annular side wall portion 42 provides a stepped out peripheral flange 44 upon which the wear ring 32 is positioned such that the wear ring 32 surrounds and engages the upper annular side wall portion 40.

Figure 3:
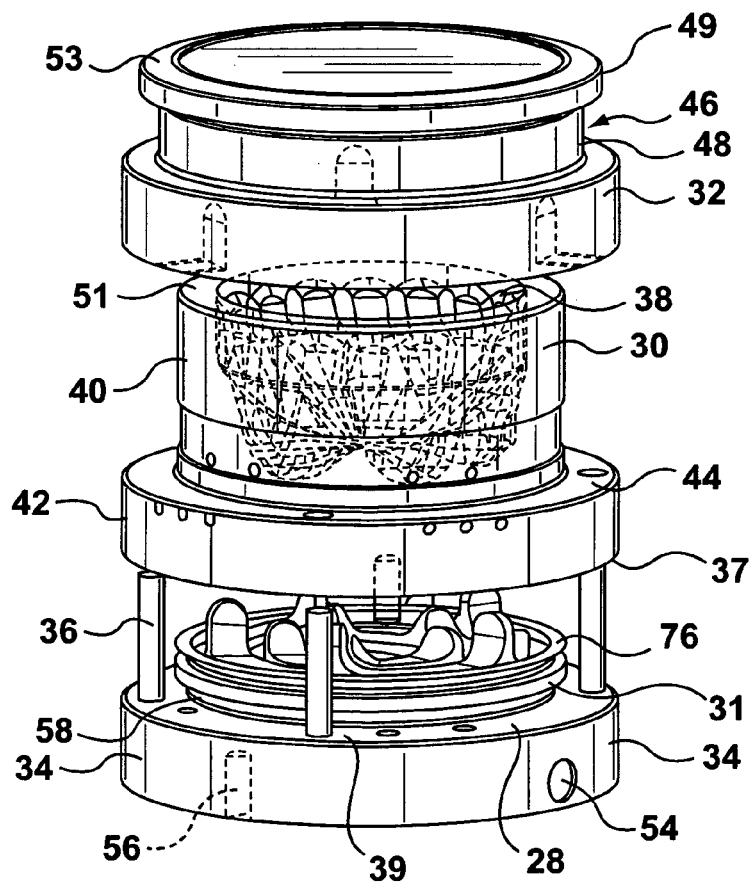
FIG. 3 is a partially exploded perspective view of the base assembly of the present invention.

The threaded fasteners 36 pass through apertures in the adaptor 34 and flange part or shoulder 44, of the base insert 30 and into threaded apertures in the wear ring 32 to secure the adaptor plate 34, the base insert 30 and the wear ring 32 together with the peripheral flange 44 of the base insert 30 sandwiched between the wear ring 32 and the adaptor 34. In FIG. 3 the fasteners 36 are evenly spaced adjacent to and around the periphery 39 of the adaptor plate 34.

The wear ring 32 is a hardened steel ring that is slip fitted around upper annular side wall portion 40 of base insert 30. The wear ring 32 has an outer wall portion 46 that is adapted to co-operate with other mold parts 12 and 14 (FIG. 1) of the mold assembly 10 during formation of the container 100. The outer wall portion 46 of the wear ring has a recessed groove 48 and a rim 49 so as to co-operate with the other mold parts during formation of the container. The rim 49 has an upper edge 53 that is either flush to or below the upper edge 51 of the base insert 30. The use of the wear ring 32 reinforces the softer and lighter base insert 38 during the formation of the container and eliminates the need for satellite welding to increase the strength of the base insert 30.

In accordance with the present invention, the cooling/heating provided within the base insert 30 adjacent the contoured surface 38 is described.

Figure 2:
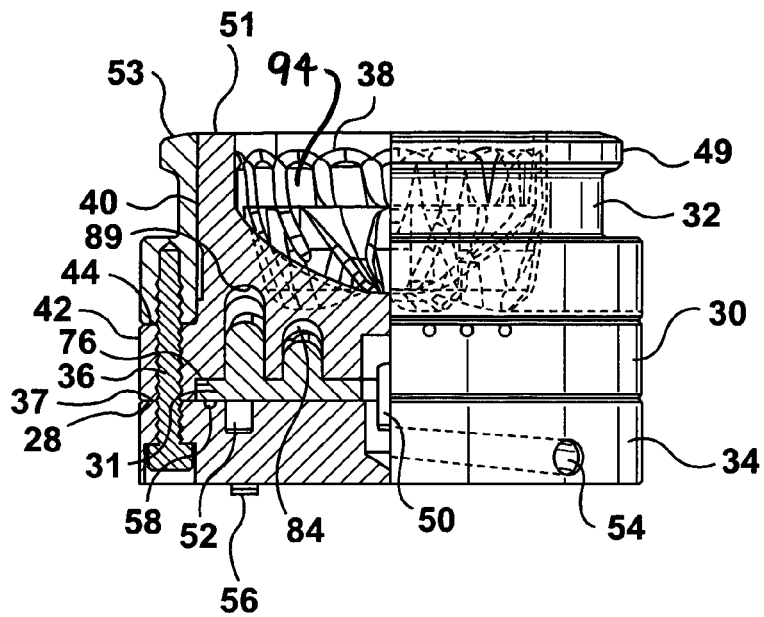
FIG. 2 is a schematic partially in section view of one embodiment of the base assembly of the present invention.

The adaptor plate 34 as seen in FIG. 2 has two fluid communication ports 50 and 52 located in the upper supporting surface 28. The first communication port 50 is centrally located of the adaptor plate 34. The second communicating port 52 is located radially outwardly from the central port 50 adjacent the periphery of the adaptor plate 34. The adaptor plate 34, includes a first inlet port 54 which communicates with the central port 50. The other communicating port 52 of the adaptor plate 34 communicates with outlet port 56. Inlet port 54 permits for cooling or heating fluid, depending on the temperature of the fluid, to pass in through inlet port 54 to the communicating port 52. From here fluid enters the base insert 30 as will be explained in more detail hereinafter. Fluid exits the base insert 30 through communication port 52 in the adapter 34 and then exits the adapter 34 through outlet port 56. Ports 54 and 56 are connected to a fluid pumping system through connectors and hoses, not shown.

Figure 6:
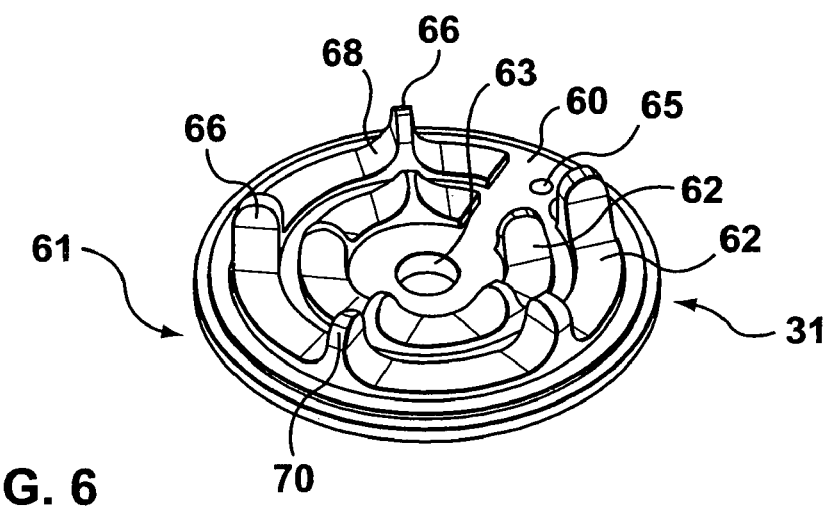
FIG. 6 is a perspective view of the flow divider plate.

Fluid movement within the base insert 30 is achieved by co-operation of the base insert 30 and the flow divider plate 31. The flow divider plate 31 is supported on the upper supporting surface 28 of the adaptor plate 34 in fluid sealing relationship therewith. The seal is provided by O-ring 58. As best shown in FIG. 6, the flow divider plate 31 has an upper surface portion 60 that has two raised runways 62 that are generally arcuate in shape and follow a first flow pattern 61 and extend around the surface 60 of the flow divider plate 31. Each of the runways 62 are spaced concentrically of each other about central aperture 63 located in the flow divider plate 31 adjacent the first fluid communication port 50 of the adaptor 34. The flow divider plate 31 has a second aperture 65 that corresponds to the location of the second fluid communicator port 52 of the adaptor plate 34. Each of the raised runways 62 has a plurality of baffles 66 which extend outwardly away from the upper surface portion 60 of the flow divider plate 31. The baffles 66 have concave surfaces or fillets 68 and a rounded upper tip portion 70. The fillets 68 assist in redirecting flow of fluid over the tip portion 70. The runways 62 and baffles 66 are machined from one surface of the flow divider plate 31.

Figure 4:
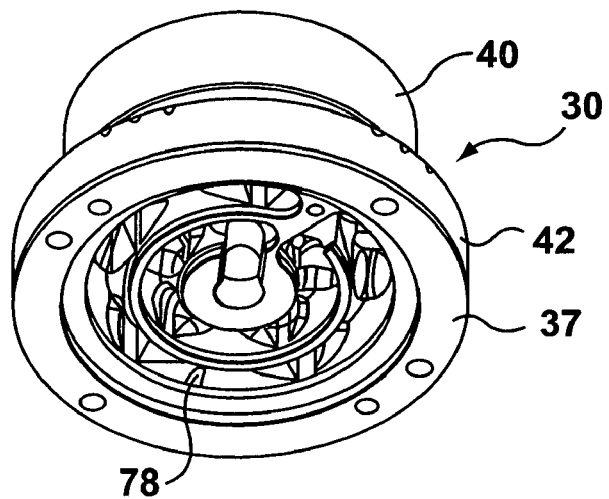
FIG. 4 is a perspective view of the base insert.
Figure 5:
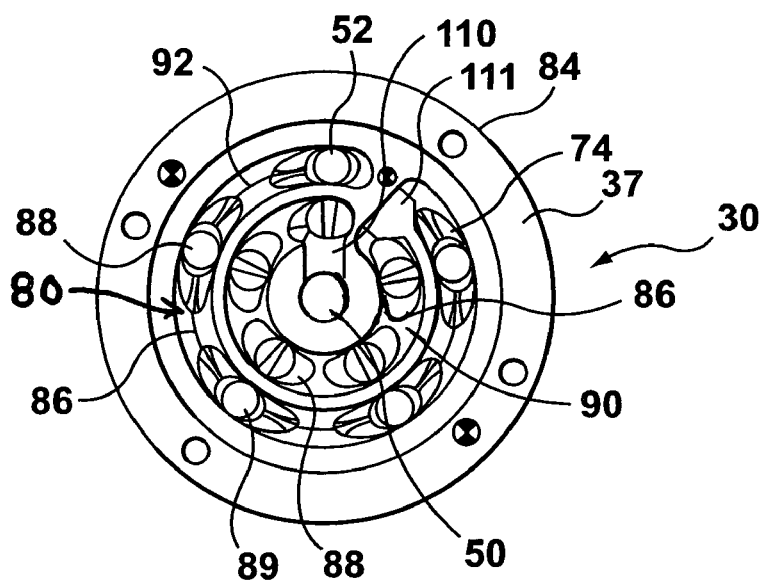
FIG. 5 is a bottom view of the base insert.

Referring to FIGS. 4 and 5, the base insert 30 has a lower surface 37 which has an interior or centrally located lower surface portion 74 mounted in sealing relationship with the flow divider plate 31 by means of O-ring 76. The lower surface portion 74 of the base insert 30 has a continuous channel 78 that extends in the second predetermined flow pattern 80. The continuous channel 78 is machined into the lower surface portion 74 of the base insert 30 in such a manner that the second flow pattern 80 of the continuous channel 78 is positioned over the raised runways 62 of the first pattern 61 of the flow divider plate 31. As the base insert 30 is secured in place relative to the adaptor plate 34, the flow divider plate 31 is sandwiched therebetween and the continuous channel 78 seals against the raised runway 62 to define a continuous fluid passageway 84 that extends between the two fluid communication ports 50, 52 of the adaptor plate 34.

The continuous channel 78 comprises a recessed groove 86 in the base insert 30 and a plurality of cavities or bores 88 that extend from the lower surface portion 74 of the base insert 30 deeper into the base insert 30 than the recessed grooves 86. The channel 78 comprises two correspondingly concentric spaced apart arcuate recessed grooves 90 and 92 which overlay the arcuate shaped raised runways 62 of the flow divider plate 31 to define inner and outer arcuate fluid passageway portions 90, 92, respectively. The contoured shape of the upper surface portion 38 of the base insert 30 has a series of indentations 94 representing the container feet. The bores 88 extend into the base insert 30 between the indentations 94 and are rounded to form a dome end portion 89.

Figure 7:
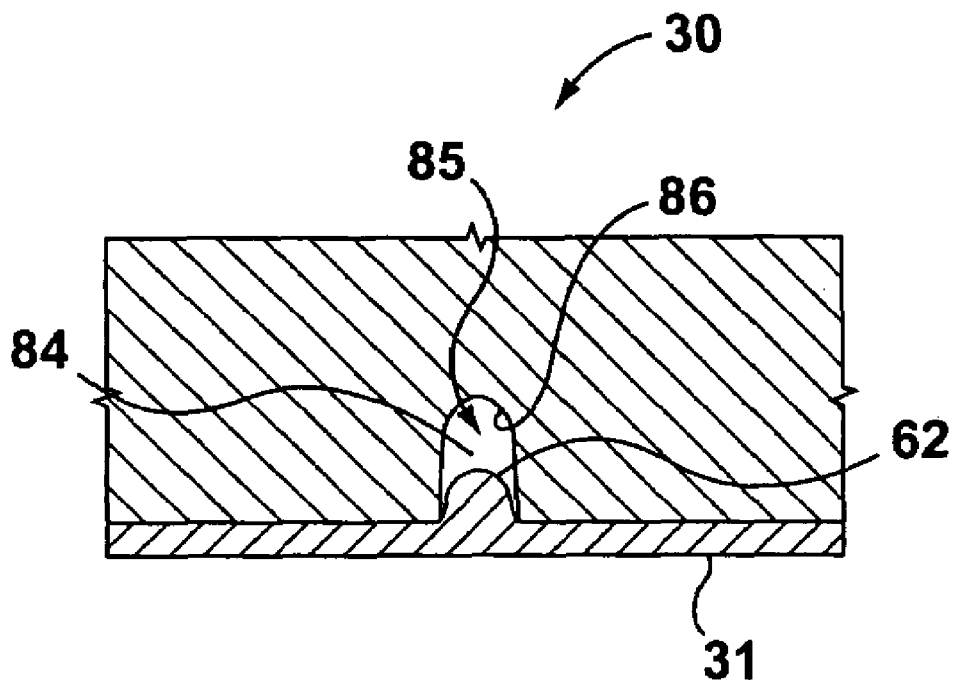
FIG. 7 is a cross-section view of the continuous fluid path between baffles of the flow divider plate; and, FIG. 8 is a cross-section view of the continuous fluid path across a baffle in the flow divider plate.
Figure 8:
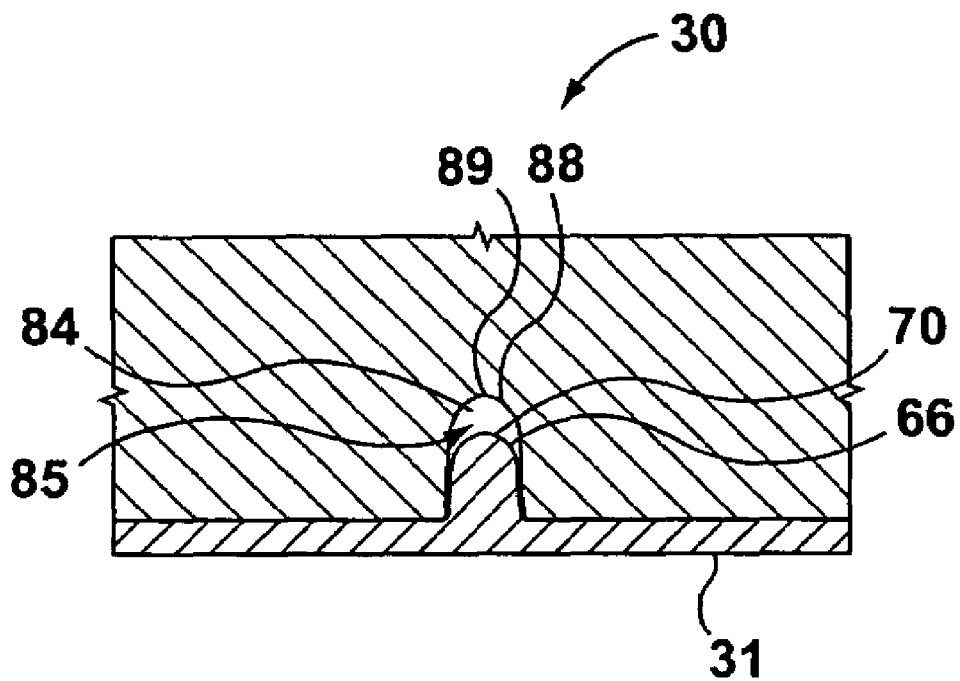

As seen in FIGS. 7 and 8, the continuous fluid passageway 84 in the base insert 30 has a cross sectional area 85 that varies along the passageway 84 to increase turbulence in the flow fluid along passageway 84. The continuous fluid passageway 84 has a cross sectional area that is greater adjacent each of the rounded tip portions 70 of baffles 66 and the corresponding dome end portion 89 of bore 88 than the cross-sectional area between the tip portions 70 and between the raised runway 62 and the recessed groove 86. Also the cross-sectional profile at these two locations differs increasing turbulence. As shown in FIG. 5, the passageway 84 has two radially extending recessed groove portions 110, 111 one of which extends from the first communication port 50 of the inner arcuate fluid passageway portion 90. The other radial recessed groove portion 111 extends from the inner arcuate fluid passageway portion 90 to the outer arcuate fluid passageway portion 92. Consequently, the present invention provides for a single continuous fluid passageway 84 in base insert 31 that enters through the center communication port 50 of the adaptor plate 34 and follows the passageway portions 110, 90, 111, and 92 out through the communication port 52 of the adaptor plate 34. This continuous passageway 84 is a continuous serial passageway whereby if there is any blockage in the passageway, it can be determined when the cooling system has a flow restriction.

While the present invention has been described with respect to illustrated embodiments, it should be understood that the scope of the present invention is defined in the claims that follow.

What is claimed is:

1. A base assembly for use as a part of a mold assembly for forming containers, the base assembly comprising:
    an adaptor plate having an upper supporting surface, the adapter plate having two fluid communication ports located in the upper supporting surface and at least one fluid inlet port and one fluid outlet port each of which communicate with a corresponding one of the two fluid communication ports;
    a flow divider plate adapted to be supported on the upper supporting surface of the adapter plate in fluid sealing relation therewith, the flow divider plate having an upper surface portion having a first flow pattern machined thereon; and,
    a base insert having a lower surface portion mounted in sealing relation with the flow divider plate, the lower surface portion of the base insert having a second flow pattern machined thereon, the second pattern being positioned adjacent at least a portion of the first flow pattern in sealing relation therewith to define a continuous fluid passageway extending between the two fluid communication ports of the adapter plate, and the base insert having an insert upper surface portion contoured to the shape of a base of the container to be formed.

2. The base assembly of claim 1 wherein the first flow pattern comprises at least one raised runway and the second flow pattern comprises a channel whereby at least a channel portion of the channel overlays the at least one raised runway to define at least a passageway portion of the continuous passageway.

3. The base assembly of claim 2 wherein the channel comprises a recessed groove in the base insert and wherein the channel comprises a plurality of cavities that extend from the lower surface portion of the base insert deeper into the base insert than the recessed groove.

4. The base assembly of claim 3 wherein the at least one raised runway has a plurality of baffles extending outwardly therefrom and into a corresponding one of the cavities to redirect flow of fluid through the cavities.

5. The base assembly of claim 4 wherein each of the cavities has a dome end portion and each of the corresponding baffles has a rounded tip portion that extends into the corresponding cavity.

6. The base assembly of claim 5 wherein the raised runway of the flow divider plate has fillet surfaces adjacent each side of each of the baffles.

7. The base assembly of claim 4 wherein the contoured shape of the insert upper surface portion has a series of indentations representing container feet and the cavities extend into the base insert between the indentations.

8. The base assembly of claim 1 wherein the continuous fluid passageway has a cross-sectional area that varies along the passageway to increase turbulence in fluid flowing along the passageway.

9. The base assembly of claim 3 wherein the continuous fluid passageway has a cross-sectional area that varies along the passageway to increase turbulence in fluid flowing along the passageway.

10. The base assembly of claim 2 wherein the flow divider plate has two concentrically spaced apart arcuate raised runways and the channel of the base insert has two corresponding concentrically spaced apart arcuate recessed groove portions with side walls that receive a corresponding one the raised runways to define inner and outer arcuate fluid passageway portions.

11. The base assembly of claim 10 wherein a first one of the communication ports is centrally located on the upper supporting surface of the adaptor plate and a second one of the communication ports is radially spaced therefrom, and the channel has two radially extending recessed groove portions, one of which extends from the first communication port to the inner arcuate fluid passageway portion and the other of which extends from the inner arcuate fluid passageway portion to the outer arcuate fluid passageway portion.

12. The base assembly of claim 2 wherein a first one of the communication ports is centrally located on the upper supporting surface of the adapter plate adapted to communicate with a first end of the continuous passageway, and a second one of the communication ports is radially spaced therefrom adapted to communicate with a second end of the communication passageway.

13. The base assembly of claim 1 further including a plurality of fasteners passing through the adaptor plate to positively locate and secure the base insert relative to the adaptor plate.

14. The base assembly of claim 1 wherein the base insert has at least one annular side wall portion and comprises a lightweight metallic material, and the base assembly further comprises:
a wear ring having an inner annular surface surrounding and engaging the at least one annular side wall portion of the base insert to protect the at least one annular side wall portion of the base insert, the wear ring comprising a hardened wear resistant metallic ring adapted to reinforce the base insert during formation of the container.

15. The base assembly of claim 14 wherein the base insert has a stepped shoulder adapted to overlay the flow divider plate.

16. The base assembly of claim 15 further including a plurality of fasteners passing through the adaptor plate and the base insert, and into the wear ring to positively locate and secure the base insert, flow divider plate and wear ring relative to the adapter plate.

17. The base assembly of claim 16 wherein the fasteners are threaded and threadably engage threaded apertures in at least in the wear ring.

18. The base assembly of claim 14 wherein the base insert and flow divider plate are made from aluminum.

19. The base assembly of claim 14 wear ring and adaptor plate comprises steel.

20. The base assembly of claim 18 wear ring and adaptor plate comprises steel.

21. The base assembly of claim 14 wherein the first flow pattern comprises at least one raised runway and the second flow pattern comprises a channel whereby at least a channel portion of the channel overlays the at least one raised runway to define at least a passageway portion of the continuous passageway and wherein the channel comprises a recessed groove in the base insert and wherein the channel comprises a plurality of cavities that extend from the lower surface portion of the base insert deeper into the base insert than the recessed groove.

22. The base assembly of claim 21 wherein the at least one raised runway has a plurality of baffles extending outwardly therefrom and into a corresponding one of the cavities to redirect flow of fluid through the cavities.

23. The base assembly of claim 22 wherein each of the cavities has a dome end portion and each of the corresponding baffles has a rounded tip portion that extends into the corresponding cavity.

24. The base assembly of claim 23 wherein the raised runway of the flow divider plate has fillet surfaces adjacent each side of each of the baffles.

25. The base assembly of claim 24 wherein the contoured shape of the insert upper surface portion has a series of indentations representing container feet and the cavities extend into the base insert between the indentations.

26. The base assembly of claim 14 wherein the continuous fluid passageway has a cross-sectional area that varies along the passageway to increase turbulence in fluid flowing along the passageway.

27. The base assembly of claim 21 wherein the flow divider plate has two concentrically spaced apart arcuate raised runways and the channel of the base insert has two corresponding concentrically spaced apart arcuate recessed groove portions with side walls that receive a corresponding one the raised runways to define inner and outer arcuate fluid passageway portions.

28. The base assembly of claim 27 wherein a first one of the communication ports is centrally located on the upper supporting surface of the adaptor plate and a second one of the communication ports is radially spaced therefrom, and the channel has two radially extending recessed groove portions, one of which extends from the first communication port to the inner arcuate fluid passageway portion and the other of which extends from the inner arcuate fluid passageway portion to the outer arcuate fluid passageway portion.

* * * * *